United States Patent
Eo

(10) Patent No.: US 8,790,015 B2
(45) Date of Patent: Jul. 29, 2014

(54) BEARING HOUSING OF WASHING MACHINE AND MANUFACTURING METHOD THEREOF

(75) Inventor: Hae Sung Eo, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 600 days.

(21) Appl. No.: 12/926,410

(22) Filed: Nov. 16, 2010

(65) Prior Publication Data

US 2011/0135239 A1    Jun. 9, 2011

(30) Foreign Application Priority Data

Dec. 9, 2009  (KR) .......................... 10-2009-0121836

(51) Int. Cl.
*F16C 43/00* (2006.01)
*F16C 43/04* (2006.01)
*D06F 23/00* (2006.01)
*B28C 5/18* (2006.01)

(52) U.S. Cl.
USPC ................. 384/537; 384/584; 68/140; 366/63

(58) Field of Classification Search
USPC ............ 384/535–537, 581, 582, 584; 68/140; 34/601; 366/63, 232
See application file for complete search history.

(56) References Cited

U.S. PATENT DOCUMENTS

| | | | | |
|---|---|---|---|---|
| 3,679,279 A | * | 7/1972 | Van Dorn et al. ............. | 384/537 |
| 6,869,226 B2 | * | 3/2005 | Henkel et al. ................. | 384/536 |
| 7,997,103 B2 | * | 8/2011 | Kim et al. ..................... | 68/140 |
| 2003/0012475 A1 | * | 1/2003 | Vignotto et al. ............... | 384/544 |
| 2006/0101864 A1 | * | 5/2006 | Namkung et al. ............. | 68/3 R |
| 2007/0125135 A1 | * | 6/2007 | Kim et al. ..................... | 68/140 |
| 2009/0148092 A1 | * | 6/2009 | Otsuka .......................... | 384/569 |
| 2010/0044810 A1 | * | 2/2010 | Eriksen et al. ................ | 257/415 |

FOREIGN PATENT DOCUMENTS

| | | |
|---|---|---|
| CN | 1199659 | 11/1998 |
| KR | 2000-0032393 | 6/2000 |
| KR | 20-0341537 | 1/2004 |
| KR | 10-2006-0031287 | 4/2006 |

OTHER PUBLICATIONS

Chinese Office Action issued Jan. 6, 2014 in corresponding Chinese Patent Application No. 201010577935.8.

* cited by examiner

*Primary Examiner* — James Pilkington
(74) *Attorney, Agent, or Firm* — Staas & Halsey LLP

(57) ABSTRACT

A bearing housing includes a bearing housing body, and a shaft support part formed at the center of the bearing housing body, wherein the shaft support part includes at least one rib groove to fix a bearing bush located on the inner circumferential surface of a front end of the shaft support part. The manufacturing method of the bearing housing uses a first mold and a second mold to form an external appearance of the bearing housing and a central core to form a shaft support part of the bearing housing, and includes inserting a bearing bush onto the outer circumferential surface of the central core, and fixing the bearing bush inserted onto the outer circumferential surface of the central core by at least one bush fixing rib formed on one of the first mold and the second mold.

3 Claims, 7 Drawing Sheets

BEARING HOUSING OF WASHING MACHINE AND MANUFACTURING METHOD THEREOF

CROSS-REFERENCE TO RELATED APPLICATIONS

This application claims the benefit of Korean Patent Application No. 2009-0121836, filed on Dec. 9, 2009 in the Korean Intellectual Property Office, the disclosure of which is incorporated herein by reference.

BACKGROUND

1. Field

Embodiments relate to a bearing housing to support a drum and a shaft of a washing machine, and a manufacturing method thereof.

2. Description of the Related Art

In general, a washing machine includes a tub to contain wash water, a drum rotatably provided within the tub, a rotary shaft connected to the drum and extended to the outside of the tub, a bearing housing to rotatably support the rotary shaft, and a driving motor connected to the rotary shaft at the outside of the tub to rotate the drum.

The bearing housing to rotatably support the rotary shaft includes a bearing housing body connected to a rear wall of the tub, and a shaft support part formed at the center of the bearing housing body.

A bearing bush is inserted into the inner circumferential surface of a front end of the shaft support part, thus preventing movement of the bearing during rotation of the shaft.

The bearing housing is generally manufactured by die-casting using aluminum alloy as a material. The bearing bush is inserted onto the outer circumferential surface of a core mold to form the shaft support part of the bearing housing.

However, if the bearing bush inserted onto the outer circumferential surface of the core mold is deviated from its original position due to high-pressure injection of aluminum during die-casting, process defects may be generated during a manufacturing process of the bearing housing.

SUMMARY

Therefore, it is an aspect to provide a bearing housing of a washing machine which improves process defects so as to improve productivity, and a manufacturing method thereof.

Additional aspects will be set forth in part in the description which follows and, in part, will be apparent from the description, or may be learned by practice of the invention.

In accordance with one aspect, a manufacturing method of a bearing housing of a washing machine using a first mold and a second mold to form an external appearance of the bearing housing and a central core to form a shaft support part of the bearing housing, includes inserting a bearing bush onto the outer circumferential surface of the central core, and fixing the bearing bush inserted onto the outer circumferential surface of the central core by at least one bush fixing rib formed on one of the first mold and the second mold.

The at least one bush fixing rib may be formed on one mold located at the upper part, among the first mold and the second mold.

The at least one bush fixing rib may be protruded such that the at least one bush fixing rib is tilted from the upper portion thereof to the lower portion thereof.

The central core may include a protrusion to support a lower end of the bearing bush.

In accordance with a further aspect, a mold set to manufacture a bearing housing of a washing machine includes a first mold and a second mold, and a central core disposed between the first mold and the second mold, wherein one of the first mold and the second mold includes at least one bush fixing rib to fix a bearing bush inserted onto the outer circumferential surface of the central core.

The at least one bush fixing rib may be formed on one mold located at the upper part, among the first mold and the second mold.

The at least one bush fixing rib may be protruded such that the at least one bush fixing rib is tilted from the upper portion thereof to the lower portion thereof.

The central core may include a protrusion to support a lower end of the bearing bush.

In accordance with another aspect, a bearing housing of a washing machine includes a bearing housing body, and a shaft support part formed at the center of the bearing housing body, wherein the shaft support part includes at least one rib groove to fix a bearing bush located on the inner circumferential surface of a front end of the shaft support part.

The at least one rib groove may be formed on the outer circumferential surface of the shaft support part.

The at least one rib groove may be configured such that the width of the at least one rib groove is decreased from the upper portion thereof to the lower portion thereof.

The at least one rib groove at the tip thereof may contact the bearing bush.

The at least one rib groove may be provided with a hole at the tip thereof.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
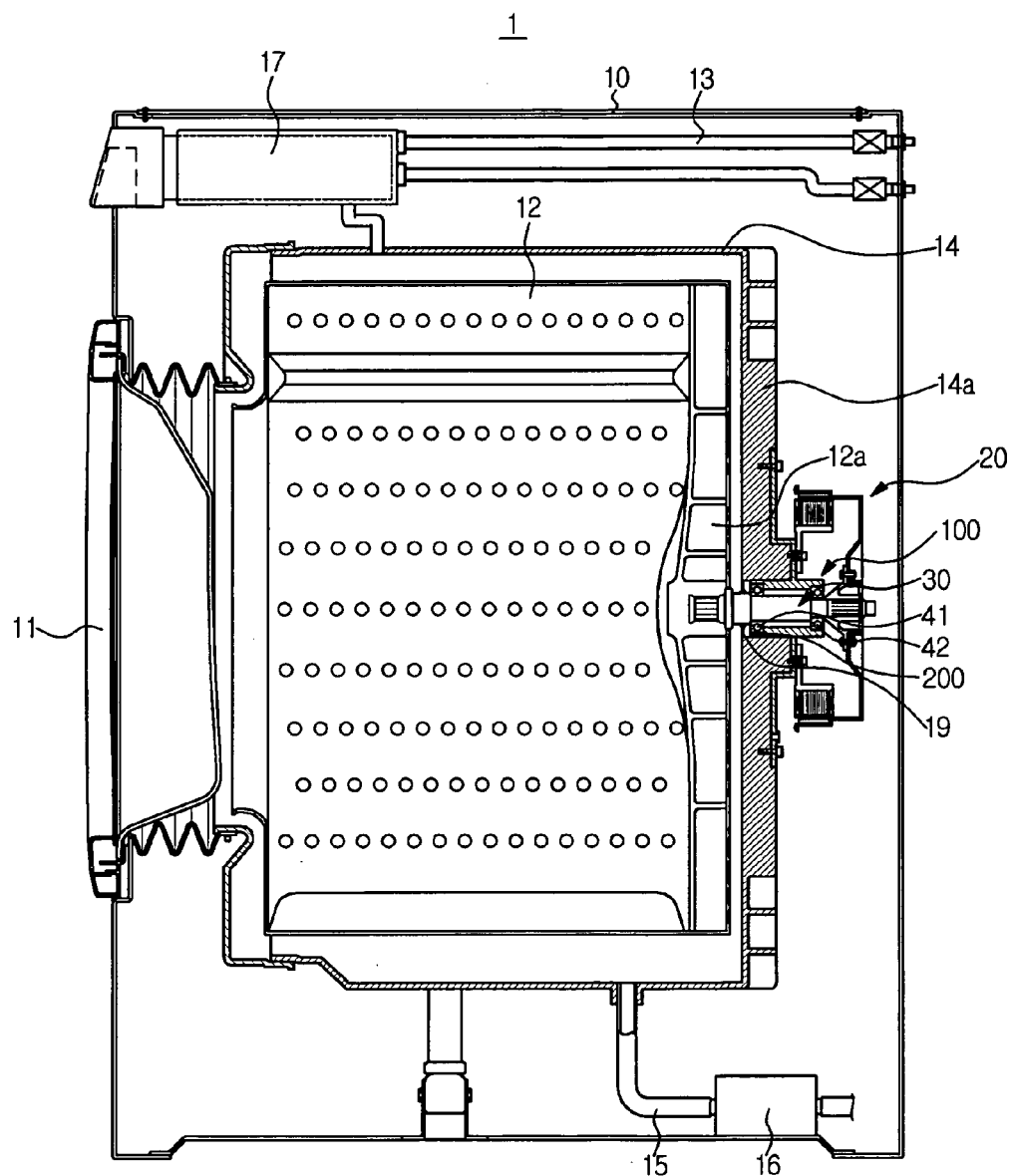
FIG. 1 is a longitudinal-sectional view of a washing machine in accordance with one embodiment.

Reference will now be made in detail to the embodiments, examples of which are illustrated in the accompanying drawings, wherein like reference numerals refer to like elements throughout.

FIG. 1 is a longitudinal-sectional view of a washing machine in accordance with one embodiment.

As shown in FIG. 1, the washing machine 1 in accordance with this embodiment includes a main body 10 forming the external appearance of the washing machine 1, a tub 14 installed in the main body 10 to store wash water, a drum 12 rotatably installed in the tub 14 to wash laundry, and a door 11 installed on the front surface of the main body 10 to open and close an opening formed through the front surface of the main body 10.

A water supply pipe 13 and a detergent supply device 17 to supply wash water and a detergent to the tub 14 are provided in the upper portion of the inside of the main body 10, and a drain pipe 15 and a drain pump 16 to discharge the wash water in the tub 14 to the outside are installed in the lower portion of the inside of the main body 10.

A driving motor 20 to rotate the drum 12 in regular and reverse directions is installed at the rear of the tub 14, and a shaft 30 to transmit driving force of the driving motor 20 to the drum 12 is installed between the drum 12 and the driving motor 20.

One end of the shaft 30 is inserted into a flange 12a connected to the rear end of the drum 12, and the other end of the shaft 30 passes through a rear wall 14a of the tub 14 and is connected to the driving motor 20.

A bearing housing 100 is installed on the rear wall 14a of the tub 14, and the driving motor 20 is connected to the rear wall 14a of the tub 14 through the bearing housing 100.

Further, bearings 41 and 42 to rotatably support the shaft 30 are respectively installed at a front end (an end close to the tub) and a rear end (an end close to the motor) of the bearing housing 100. A bearing bush 200 is located between the outer surface of the front bearing 41 and the inner surface of the bearing housing 100 contacting the outer surface of the front bearing 41, thus preventing movement of the front bearing 41 close to the tub 14 while more firmly supporting the shaft 30.

An oil seal 19 to prevent leakage of wash water is provided between the flange 12a of the drum 12 and the bearing housing 100.

Hereinafter, the bearing housing 100, a manufacturing method thereof, and a mold set used to manufacture the bearing housing 100 in accordance with the embodiment will be described in detail.

Figure 2:
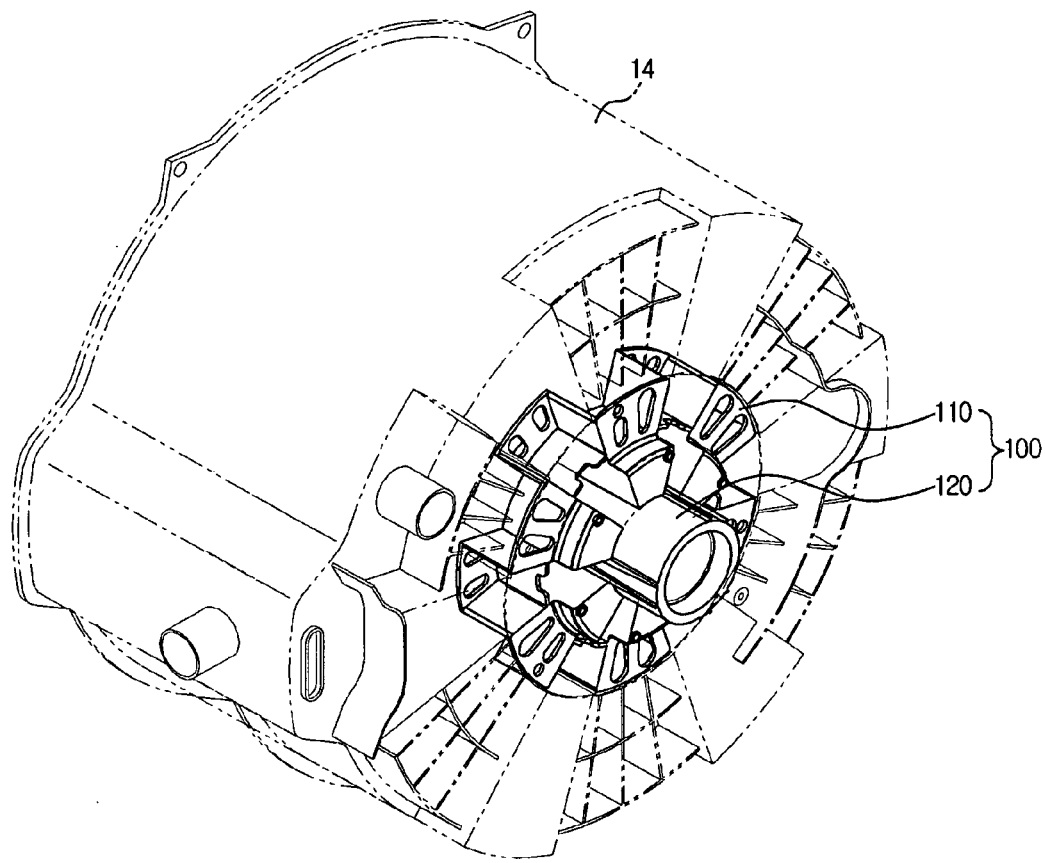
FIG. 2 is a perspective view illustrating connection relations between a bearing housing and a tub in accordance with the embodiment.

FIG. 2 is a perspective view illustrating connection relations between the bearing housing 100 and the tub 14 in accordance with this embodiment.

As shown in FIG. 2, the bearing housing 100 includes a bearing housing body 110 forming the external appearance of the bearing housing 100, and a shaft support part 120 formed at the center of the bearing housing body 110.

The tub 14 is made of functionalized random propylene polymer (FRPP), and is generally manufactured by injection molding. Here, the bearing housing 100 is assembled with the washing machine 1 under the condition that the bearing housing 100 is inserted onto the rear wall of the tub 14.

Figure 3:
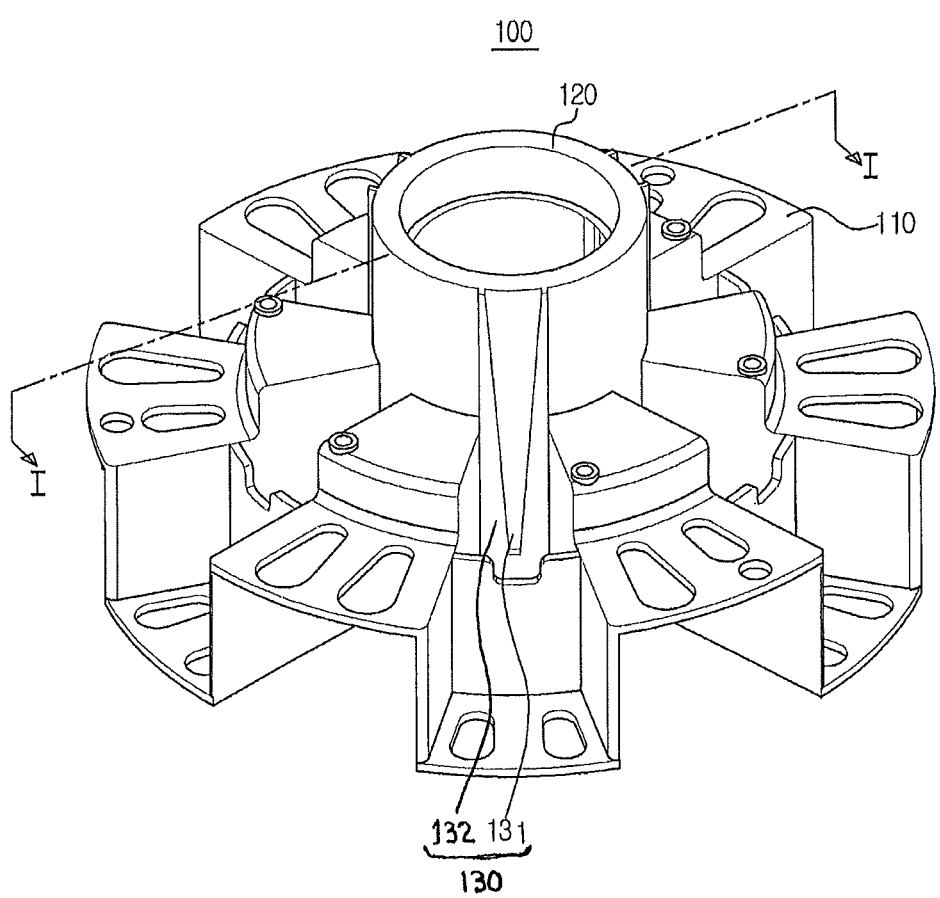
FIG. 3 is a perspective view of the bearing housing in accordance with the embodiment.
Figure 4:
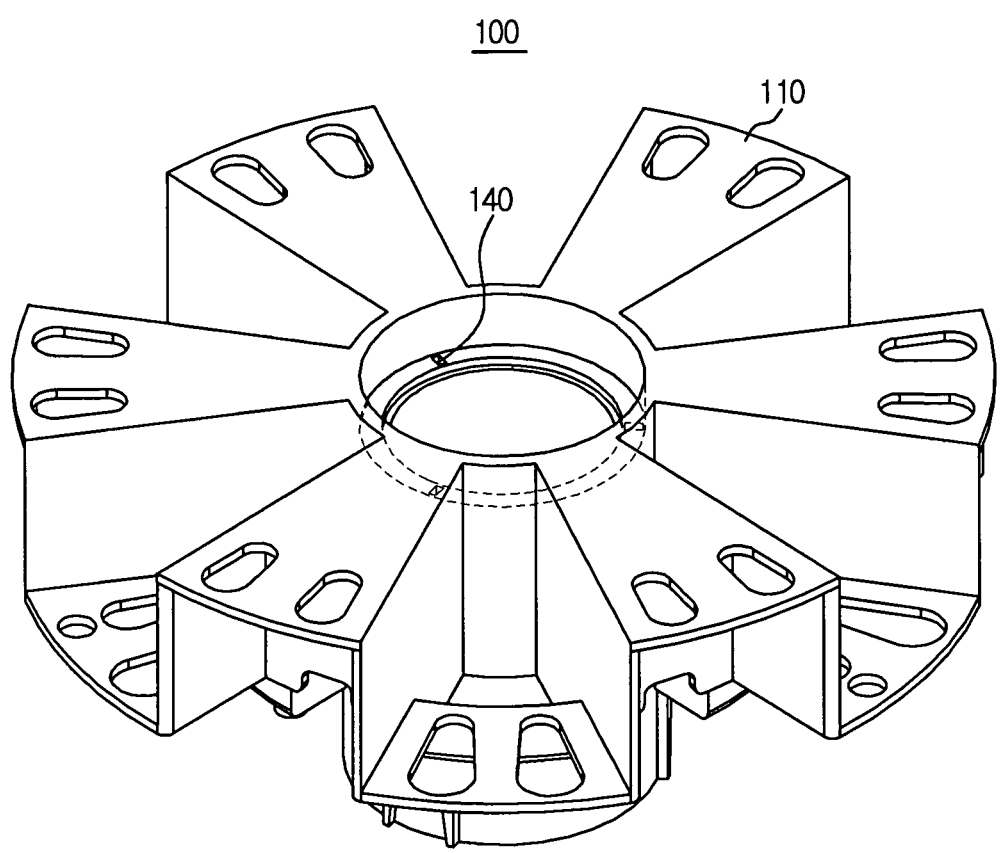
FIG. 4 is a perspective view of the bearing housing of FIG. 3, seen from the bottom.
Figure 5:
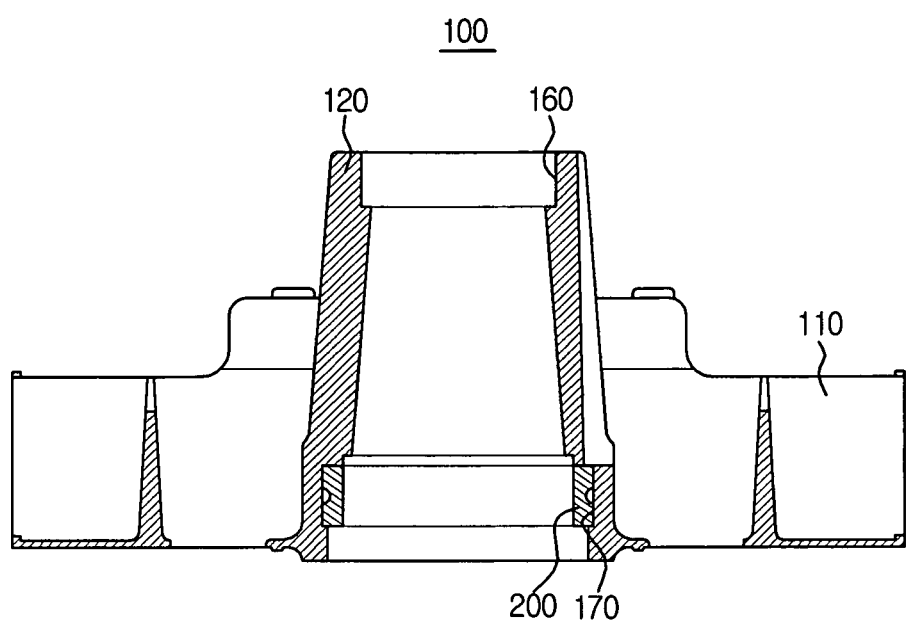
FIG. 5 is a longitudinal-sectional view of the bearing housing into which a bearing bush is inserted, taken along the line I-I of FIG. 3.

FIG. 3 is a perspective view of the bearing housing 100 in accordance with this embodiment, FIG. 4 is a perspective view of the bearing housing 100 of FIG. 3, seen from the bottom, and FIG. 5 is a longitudinal-sectional view of the bearing housing 100 into which the bearing bush 200 is inserted, taken along the line I-I of FIG. 3.

As shown in FIGS. 3 and 4, at least one rib groove 130 is formed on the outer circumferential surface of the shaft support part 120. Here, the rib groove 130 is composed of a groove 131 in a rib 132.

The rib groove 130 is formed at a position corresponding to a bush fixing rib 350 formed on the mold set to manufacture the bearing housing 100, which will be described later.

Further, the rib groove 130 is configured such that the width of the rib groove 130 is gradually decreased from the upper portion thereof to the lower portion thereof.

Such a configuration of the rib groove 130 allows the bearing housing 100 to be easily separated from the mold set, after completion of the molding of the bearing housing 100.

Further, the tip of the rib groove 130 is provided with a hole 140, and contacts the bearing bush 200.

That is, the bush fixing rib 350 formed on the mold set to manufacture the bearing housing 100, which will be described later, contacts the upper surface of the bearing bush 200 inserted onto a central core 310 to fix the bearing bush 200, and thus such a contact part is not filled with aluminum or aluminum alloy in a semi-solid state (with reference to FIGS. 6 and 7).

As shown in FIG. 5, a first insertion plane 160, into which the bearing 42 is inserted, and a second insertion plane 170, into which the bearing bush 200 is inserted, so as to prevent movement of the shaft 30 (with reference to FIG. 1) in axial and circumferential directions are provided on the inner circumferential surface of the shaft support part 120 formed at the center of the bearing housing body 110.

The bearing bush 200 is located on the second insertion plane 170, and the bearing 41 is inserted onto the inner circumferential surface of the second insertion plane 170. Here, since the rib groove 130 formed on the outer circumferential surface of the shaft support part 120 fixes the bearing bush 200 at the outside, the bearing bush 200 does not move and stably support the shaft 30 although force in the axial and circumferential directions due to rotation of the shaft 30 is applied to the bearing bush 200.

Figure 6:
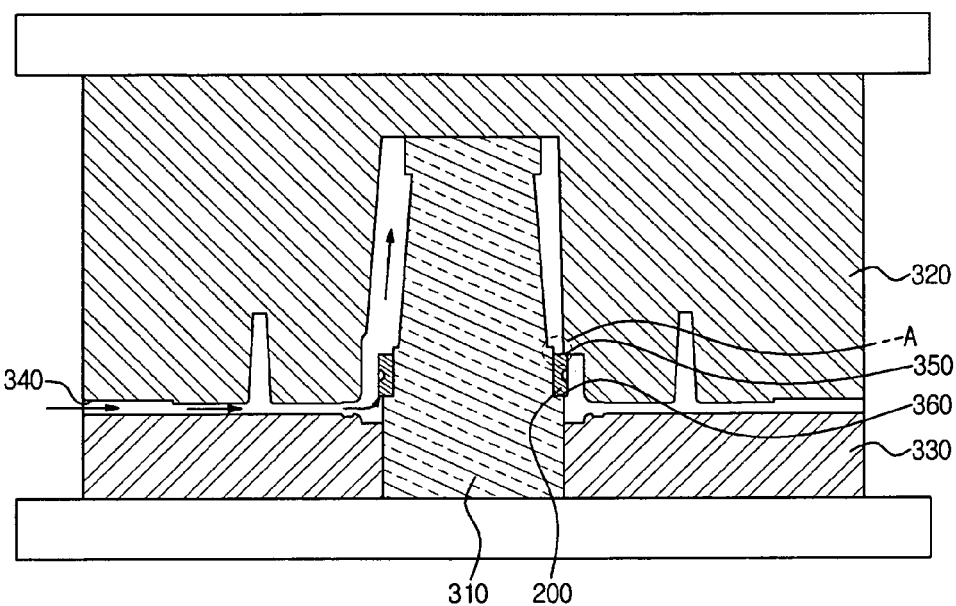
FIG. 6 is a longitudinal-sectional view of a mold set used in a manufacturing process of the bearing housing in accordance with the embodiment.
Figure 7:
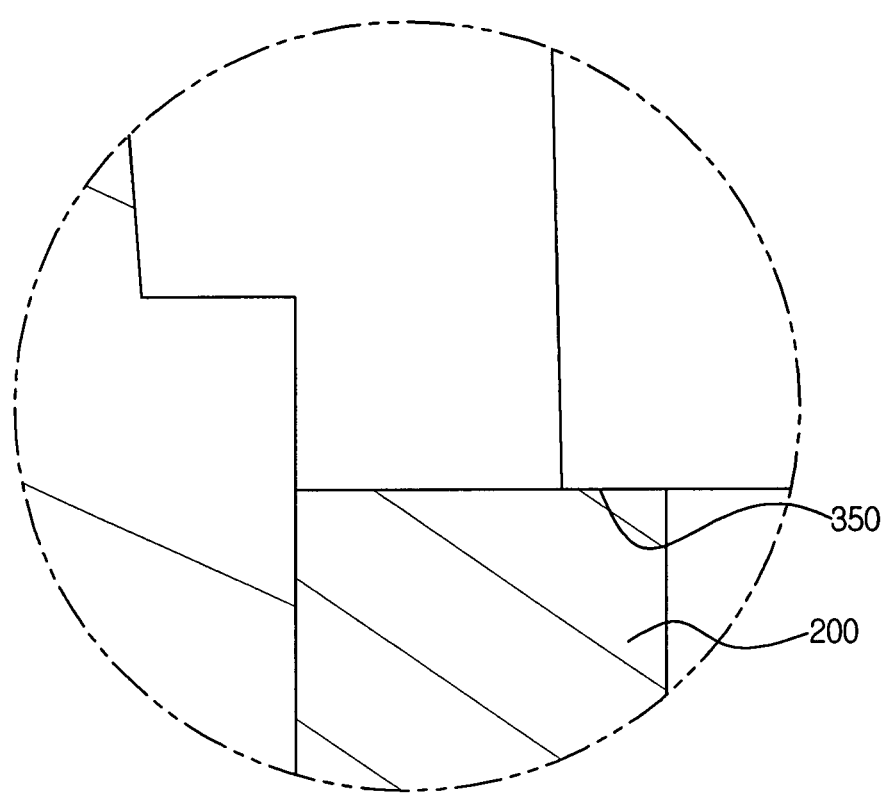
FIG. 7 is an enlarged view of the portion 'A' of FIG. 6.

FIG. 6 is a longitudinal-sectional view of a mold set used in the manufacturing process of the bearing housing 100 in accordance with this embodiment, and FIG. 7 is an enlarged view of the portion 'A' of FIG. 6.

As shown in FIG. 6, the mold set for die-casting of the bearing housing 100 in accordance with this embodiment includes the central core 310 to form the shaft support part 120, and a first mold 320 and a second mold 330 to form the bearing housing body 110.

The bearing bush 200 is inserted onto the outer surface of the central core 310.

The bearing housing 100 and the bearing bush 200 are elements to support the shaft 30 which transmits the driving force of the driving motor 20 to the drum 12, and thus precise connection between the bearing housing 100 and the bearing bush 200 is essentially required. If an error in the precise connection therebetween occurs, the error may cause vibration or noise of the entire washing machine. Therefore, the bearing bush 200 is inserted into the mold set to manufacture the bearing housing 100.

When installation of the central core 310, the first mold 320 and the second mold 330 has been completed, aluminum or aluminum alloy in a semi-solid state is injected into the mold set through an injection hole 340.

As shown in FIG. 7, the bush fixing rib 350 is formed on one of the first mold 320 and the second mold 330, thereby preventing the bearing bush 200 inserted onto the central core 310 of the mold set from being pushed due to high-pressure injection of aluminum or aluminum alloy in the semi-solid state.

The bush fixing rib 350 may be formed on one mold which is located at the upper part, among the first mold 320 and the second mold 330.

Further, the bush fixing rib 350 is protruded such that the bush fixing rib 350 is tilted from the upper portion thereof to the lower portion thereof. Such a configuration of the bush fixing rib 350 allows the bearing housing 100 from being easily separated from the mold set, after completion of the molding of the bearing housing 100.

A protrusion 360 to support the lower end of the bearing bush 200 is formed on the central core 310.

Aluminum or aluminum alloy in the semi-solid state fills the inside of the mold set in the direction of arrows of FIG. 6. Here, the bearing bush 200 inserted onto the central core 310 may be deviated from its original position due to high-pressure injection of aluminum or aluminum alloy in the semi-solid state.

In accordance with this embodiment, both the upper part and the lower part of the bearing bush 200 are respectively fixed by the bush fixing rib 350 formed on one of the first mold 320 and the second mold 330 and the protrusion 360 formed on the central core 310, and thus the bearing bush 200 is not pushed by high-pressure injection of aluminum or aluminum alloy in the semi-solid state during die-casting.

Therefore, generation of size defects of the bearing housing 100 caused by movement of the bearing bush 200 is greatly reduced, and thus productivity of the bearing housing 100 is improved.

Further, if the bearing housing 100 manufactured by the above process is assembled with the washing machine, the bearing housing 100 more stably supports the shaft 300, thereby reducing vibration and noise of the washing machine.

The bush fixing rib 350 formed on one of the first mold 320 and the second mold 330 forms the rib groove 310 and the hole 140 on the outer circumferential surface of the shaft support part 120 of the bearing housing 100.

The bearing housing 100 may be made of aluminum or aluminum alloy, and the bearing bush 200 may be made of steel.

Hereinafter, a manufacturing method of the bearing housing 100 through the above-described central core 310, first mold 320, and second mold 330 will be described.

First, the central core 310, the first mold 320, and the second mold 330 are disposed. Then, the bearing bush 200 is inserted onto the outer circumferential surface of the central core 310, and aluminum or aluminum alloy in a semi-solid state, which is a material for the bearing housing 100, is injected into the mold set through the injection hole 340.

Thereafter, when hardening of aluminum or aluminum alloy has been completed, the bearing housing 100 is separated from the central core 310, the first mold 320, and the second mold 330. Thereby, manufacture of the bearing housing 100 is finished.

Here, the bearing housing 100 into which the bearing bush 200 is inserted is obtained.

As is apparent from the above description, in accordance one embodiment of the present invention, defects of a bearing housing due to movement of a bearing bush are prevented.

Further, productivity of the bearing housing is improved.

Moreover, if the bearing housing and the bearing bush are assembled with a washing machine, vibration and noise of the washing machine are reduced.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A bearing housing of a washing machine having a front surface and a rear surface, the bearing housing comprising:
    a bearing housing body;
    a shaft support part formed at the center of the bearing housing body, the shaft support part having a front end and a rear end corresponding to the front surface and rear surface of the washing machine, respectively; and
    a bearing bush located on the inner circumferential surface of a front end of the shaft support part,
    wherein the shaft support part includes at least one rib groove, the at least one rib groove being composed of a groove in a rib formed on the outer circumferential surface of the shaft support part, and
    the at least one rib groove is configured such that a width of the groove in the at least one rib groove decreases in an axial direction from the rear end toward the front end of the shaft support part.

2. The bearing housing according to claim 1, wherein the width of the groove in the at least one rib groove decreases in an axial direction from the rear end toward the front end of the shaft support part to a tip, and the tip of the at least one rib groove contacts the bearing bush.

3. The bearing housing according to claim 2, wherein the groove in the at least one rib groove is provided with a hole at the tip thereof.

* * * * *